A. O. TATE.
BIFUNCTIONAL STORAGE BATTERY PLATE.
APPLICATION FILED SEPT. 16, 1910.
1,060,216.
Patented Apr. 29, 1913.
2 SHEETS—SHEET 2.
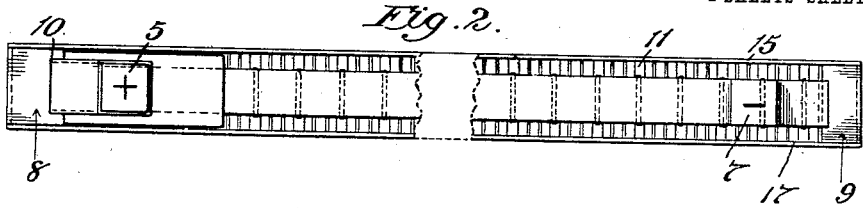
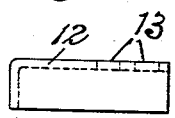
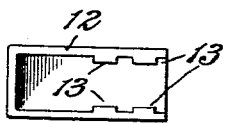
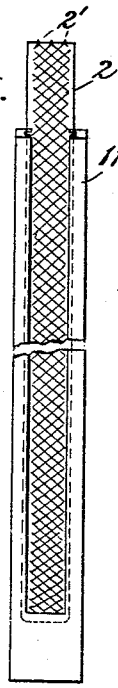
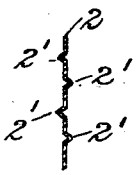
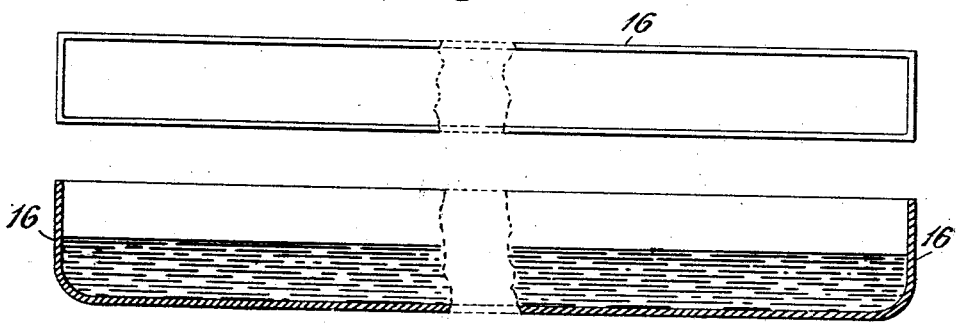
Witnesses:
Inventor
Alfred O. Tate
By Attorney
Charles J. Kintner

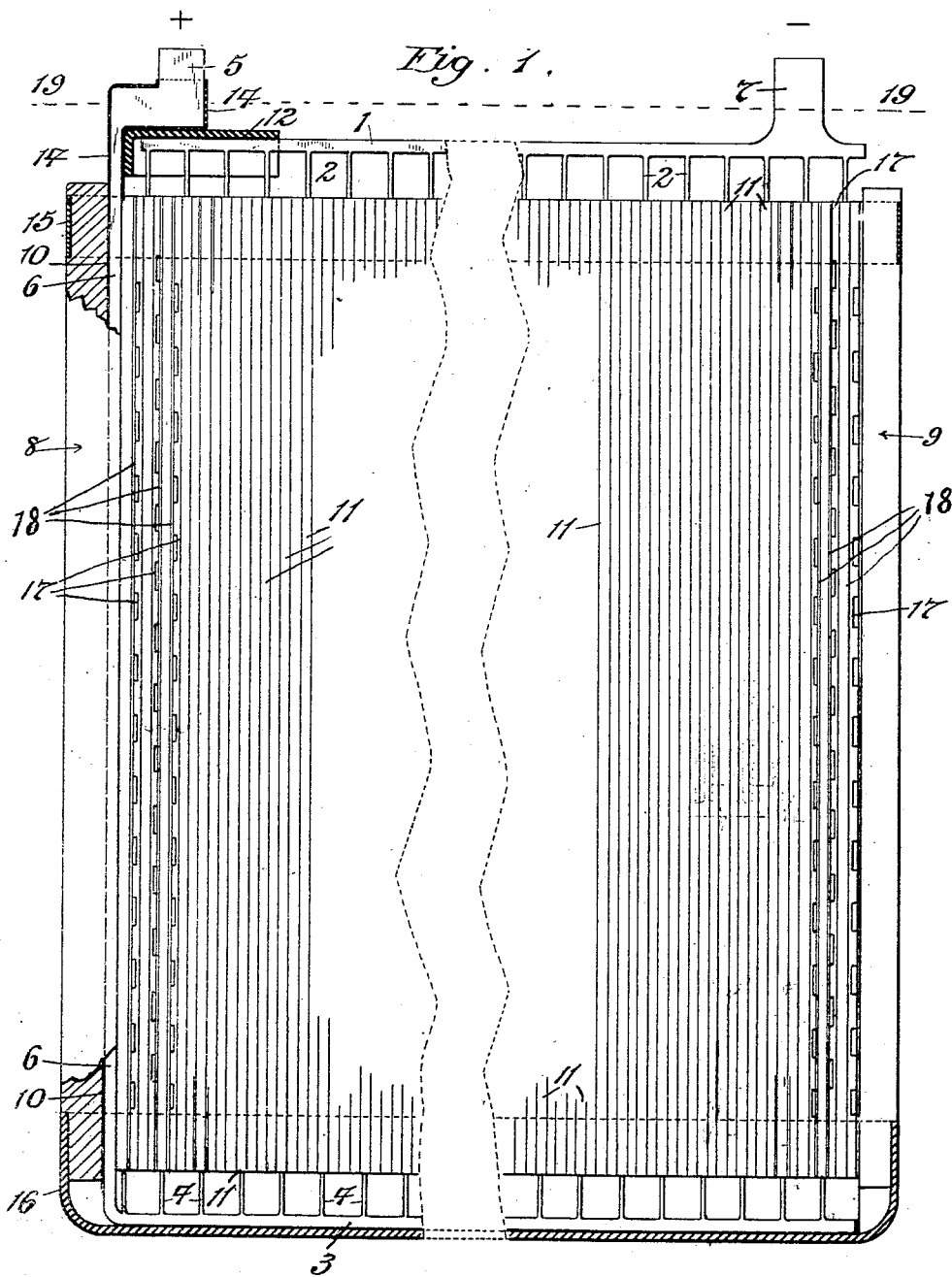

UNITED STATES PATENT OFFICE.

ALFRED O. TATE, OF TORONTO, ONTARIO, CANADA.

BIFUNCTIONAL STORAGE-BATTERY PLATE.

1,060,216.  Specification of Letters Patent.  Patented Apr. 29, 1913.

Application filed September 16, 1910. Serial No. 582,344.

*To all whom it may concern:*

Be it known that I, ALFRED O. TATE, a subject of the King of Great Britain, and resident of the city of Toronto, Ontario, Dominion of Canada, have made a new and useful Invention in Bifunctional Storage-Battery Plates, of which the following is a specification.

My invention is directed particularly to improvements in bifunctional storage battery plates, such as are disclosed in a number of prior patents granted to me by the United States Patent Office, particularly U. S. Patents No. 880,422 granted February 25th, 1908, and No. 926,710, granted June 29th, 1909, and it has for its objects, first, to provide a bifunctional storage battery plate of the type disclosed in the before-mentioned patents, in which the internal resistance of the plate is materially decreased; second, to provide means for binding or securing the individual parts of such completed plates together in a more compact and effective manner; third, to provide a plate of the type indicated which shall be practically free from damaging or weakening oxidation or Planté action at any point upon the anode plate during the act of charging; fourth, to provide a plate which shall be so effectually insulated at all of the parts where insulation is necessitated that there is practically no possibility of damaging oxidation or damaging results, due to charging; fifth, to so construct the individual anode and cathode strips that the active material will be in effect welded thereto, after the battery has been charged a sufficient number of times, thereby better assuring the retaining of such active material in place.

In the prior patents above referred to the anodes and cathodes are constructed of relatively thin narrow conducting ribbons, preferably of lead, supported at their opposite sides in grooves in insulating frames, which frames are interleaved, the anode strips all being lead burned together at the top and the cathode strips similarly lead-burned together at the bottom, binding plates of insulating material being provided at the lateral sides of the plate and all held together by two binding bolts located respectively at the opposite ends of the plate, the active material being secured against the faces of the respective strips and held in either by interleaved porous insulating strips, as disclosed in Patent No. 880,422, or by pairs of relatively thin perforated mechanical separators made of such material as celluloid or the like and so constructed as to afford free circulation of the electrolyte and gases, as disclosed in Patent No. 926,710.

I have ascertained in actual practice that where the individual parts of such bifunctional plates are bound together by bolts extending through the ends of the strip supporting frames and the ends of the anode strips next adjacent to the interconnected lead-burned ends thereof, and through the like ends of the frames and ends of the cathode strips next adjacent to the interconnected lead-burned ends thereof, there is not always good electrical connection, and that, therefore, the actual resistance of the individual lead strips of such anodes and cathodes is necessarily relatively considerably increased, and is oftentimes materially subsequently increased where oxidation takes place between the anode strips and such bolts.

My present improvement, therefore, is designed to overcome this defect and to materially decrease the internal resistance and also prevent oxidation at the anode end of the plate. I effect these materially important results by doing away with the holes in the strips for the insertion of the bolts, as hereinbefore stated, thereby leaving them in both instances with the same relative conductive capacity at all points throughout their entire lengths, and I accomplish this by securing all of the parts together by binding means exterior to the body of the plate, preferably by a binding cup at the lower end of the plate, which lower end I may add I prefer to constitute the anode of the plate, and by a retaining band around the upper end thereof.

My invention will be fully understood by referring to the accompanying drawings, in which, Figure 1 is a full sized side elevational view of one of my improved bifunctional storage battery plates, illustrated as broken apart in the center, showing also by a dotted line at the top of the plate the proper point of immersion in the electrolyte, one of the side binding plates and the binding means therefor being shown in sectional view both at the top and bottom. Fig. 2 is a plan view of Fig. 1 as seen looking thereat from the top toward the bottom of the drawing. Fig. 3 is a side elevational view illustrating the means for insulating the exposed part of the anode conductor from the top or lead-burned part of the cathode. Fig. 4 is a plan view of the same part as seen looking at Fig. 3 from the bottom toward the top of the drawing. Fig. 5 is a plan view of the insulating band or means for binding all of the elements of the upper part of the plate together; and Fig. 6 is a sectional view of the cup or means for binding the corresponding element of the lower part of the plate together, the liquid insulating medium being shown in fused form in said cup. Fig. 7 is a side elevational view of one of the anode or cathode strips, said figure illustrating also the individual frame for holding or supporting such strip, the strip and the frame being shown as broken apart at the center. Fig. 8 is an enlarged detail sectional view of one of the strips showing the manner of providing a plurality of sharp points on the opposite faces thereof for the purpose of effecting practical integral connection with the active material to the strip.

Referring now to the drawings in detail, 1 represents the lead burned or top portion of the cathode and 2, 2, the cathode strips, 3 representing the similar lead-burned portion of the anode and 4, 4, the anode strips. 5 represents the anode conductor at the top of the plate which is connected directly to the lead-burned part 3 by a downwardly extending lead conductor 6, 7 being the exposed cathode conductor integral with the lead-burned top 1. 8 and 9 represent binding plates made of insulating material and of preferably the same thickness or width as the parts of the plate proper. The plate 8 is provided with a groove 10 (see Figs. 1 and 2) extending throughout its entire length and for receiving and securely holding the conductor 6 running to the lower end of the anode 3. 11 represents one of the individual frames of the anode or cathode, such as are fully described and claimed in the beforementioned patents. The only substantial difference between these frames and those disclosed in the beforementioned patents is that the holes at the opposite ends of such strips through which the binding bolts are passed, have been omitted as unnecessary.

12 represents a rectangular or box-shaped device made of insulating material, such as hard rubber, and provided on its under side with lugs or extensions 13, 13 adapted to be sprung into position between the upper ends of the cathode strip 2 so as to securely hold it upon the upper left-hand surface thereof, and thereby insulate the cathode from the anode conductor 5 at its exposed end.

14 represents an insulating medium which is coated upon or surrounds the anode conductor 5 and extends downward a short distance on the conductor 6, the function of these parts being to prevent any possibility of a short circuit current flow between the anode and cathode at the point indicated.

15, 15 represent grooves cut in the outside faces of the upper ends of the insulating binding plates 8 and 9, said grooves being for the purpose of receiving and locking in secure bound relation all of the intervening parts through the agency of a locking band 16 (see Fig. 5). A similar band 16 is provided at the lower end adapted to be slipped over the ends of corresponding notches at the lower ends of the insulating plates 8 and 9. Although a similar band may be used at the lower end I prefer to have this locking part in the nature of a cup of insulating material, as illustrated in Fig. 6 of the drawings, which cup is adapted to receive a fused liquid insulating material, such as paraffin or pitch. One or more intermediate bands like 16 might be similarly used, if desired, but I find two such bands have a sufficient binding effect to effectually hold all of the parts together in proper relation.

17, 17 and 18, 18 represent respectively mechanical separators for holding the active material in place and for separating the individual anode and cathode strips 2 and 4 and their individual supporting frames 11 from each other, these parts being identically like the corresponding parts disclosed in Patent No. 926,710, except that as in the case of the frames the bolt holes at the opposite ends thereof are dispensed with, as will be readily understood in view of the description of my novel means of supporting all of the parts exteriorly.

19, 19, Fig. 1 is a dotted line representing the preferred depth of immersion of my novel plate in the electrolyte.

In assembling the parts of my improved bifunctional storage battery plate the anode and the cathode strips 2 and 4 are drawn respectively into their corresponding supporting frames 11, and the active material, preferably lead oxid, is packed in place on the opposite faces thereof, until the same is flush with the faces of the supporting frames in the manner disclosed in my prior patents. Said parts are then interrelated in the manner shown in the drawings with the mechanical separators between them, after which the anode strips are lead-burned together and the cathode strips correspondingly lead-burned together, a lead conductor 6 being attached to the part 3 and the exterior anode and cathode conductors 5 and 7 secured to the anodes and cathodes, as shown. The insulating device 12 is then slipped into position and the lugs or extensions 13, 13 locked between the corresponding anode and cathode strips. The binding plates 8 and 9 are then located in position and the locking band 16 of hard rubber or other insulating material, or of metal properly insulated is secured in place in the grooves 15, 15. The lower ends of the plates 8 and 9 are then drawn firmly together and the lower end of the plate and said binding plates are then forced downward into the cup of the band 16, thus causing the fused insulating medium to be forced upward until all of the parts at the lower end of the plate are effectually insulated; the insulating medium is then allowed to harden and the plate is ready for use.

Referring now to Fig. 8 I will describe another feature of novelty which constitutes an important element of the present invention, in which figure of the drawings is illustrated a longitudinal section of one of the anode or cathode strips before the active material is applied thereto. In the forming of these lead strips I prick, indent, or emboss, or in any preferred manner so roughen that part of the strip to which the active material is to be applied as to present a relatively great plurality of sharp points 2' 2' on opposite sides thereof, leaving sufficient marginal edges as shown in Fig. 7 to permit of the free insertion of such edges into the grooves in the frames 11. I have ascertained that an anode or cathode strip of this nature will practically integrally unite such active material to it during use, by reason of the effect of the sharp points in continuous charging; in other words, I have ascertained that in the use of plain lead strips with smooth surfaces the active material, such as lead oxid, will not become united thereto and will, therefore, have a tendency to be scaled off; while strips or plates prepared as hereinbefore described will so effectually unite the active material to them during the process of charging that there is no possibility of disintegration during use, and this I regard as one of the most important features of my present improvement.

I do not limit my invention to the specific details of construction illustrated in the accompanying drawings as a number of the features thereof might be materially departed from and still come within the scope of my claims. I believe it is broadly new with me to unite all of the elements of a bifunctional storage battery plate together by exterior binding means, whether the same be in the nature of bands and a cup as illustrated in the drawings, or any means whereby continuously applied exterior pressure will effect such a union of the parts as to securely bind them together, and I desire to have it understood that my claims are of the most generic nature in this respect.

I am aware that it has heretofore been proposed to provide cups or pits in a storage battery plate for receiving the active material, and I make no claim hereinafter broad enough to include such a structural arrangement, the sharp or pointed nature of the points 2' making it possible to effect an integral relation between the active material and the plate or strip, which union, so far as I am aware has never heretofore been effected, such a structural strip or plate being, therefore, practically indestructible by virtue of any scaling effect between the active material and the supporting strip or plate.

Having thus described my invention what I claim and desire to secure by Letters Patent of the United States is—

1. A bifunctional storage battery plate having a plurality of anode strips connected together at their lower ends to a common conductor extending to the top of the plate and surrounded with insulating material; a plurality of cathode strips connected together at their upper ends to a common conductor; separating media for said anode and cathode strips; binding plates of insulating material which are provided with grooved ends; together with yielding means at the top of said strips, and a cup at the bottom thereof, the arrangement being such that the entire plate is expansible, substantially as described.

2. A bifunctional storage battery plate provided with insulating binding plates located at the opposite sides thereof; yielding means at the top and bottom for binding all of said parts together, the anode strips being all connected together by a conductor located in a groove within one of said binding plates and the cathode strips being similarly connected together by a corresponding conductor located at the top of the plate; together with insulating means located at the top of the plate for insulating the anodes and cathodes from each other, substantially as described.

3. A bifunctional storage battery plate embracing a series of anode and cathode strips and two insulating binding plates located at the opposite sides thereof; in combination with elastic means located at the top and bottom of said binding plates for yieldingly holding them together, and a conductor located in a groove in one of said plates for electrically connecting the anode strips to the positive terminal of the battery, a similar conductor connecting the cathode strips with the negative terminal thereof, substantially as described.

4. A bifunctional storage battery plate embracing a plurality of anode strips and a plurality of cathode strips insulated from each other; a pair of insulating binding plates located at the opposite sides of the plate and held together by yielding means at the upper end thereof; a cup at the lower end yielding inclosing said binding plate and strips, the anode strips being connected together at their lower end and to a conductor located in a groove in one of said binding plates and insulated from the cathode strips, the latter being connected together at their upper end by a common conductor located at the top of the plate, substantially as described.

5. A bifunctional storage battery plate provided with binding bands for holding all of the parts of the plate together, and an insulating cup filled with an insulating medium which effectually insulates one end of the plate, substantially as described.

6. A bifunctional storage battery plate provided with a bottom cup which surrounds all of the elements at the lower end thereof and is secured thereto by a hardened or set insulating medium; in combination with a binding band at the top of the plate, substantially as described.

7. In a bifunctional storage battery a plurality of anode and cathode strips provided each with sharp points on its opposite face and each sustained by a frame; separating media between the frames; active material held in place in integral relation with the faces of such strips, and means for binding all of such strips in operative relation with each other, substantially as described.

In testimony whereof I have signed my name to this specification in the presence o two subscribing witnesses.

ALFRED O. TATE.

Witnesses:
C. J. KINTNER,
M. F. KEATING.